United States Patent [19]

Smith

[11] 4,113,396
[45] Sep. 12, 1978

[54] BALL JOINT WITH SLOTTED SPRING BIASED STUD

[75] Inventor: Stanley E. Smith, Dayton, Ohio

[73] Assignee: General Motors Corporation, Detroit, Mich.

[21] Appl. No.: 829,279

[22] Filed: Aug. 31, 1977

[51] Int. Cl.² .............................................. F16D 1/12
[52] U.S. Cl. .................................................. 403/138
[58] Field of Search ............... 403/122, 132, 133, 135, 403/138, 144, 120

[56] References Cited

U.S. PATENT DOCUMENTS

| 3,006,673 | 10/1961 | Swick | 403/122 |
| 3,272,541 | 9/1966 | Latzen | 403/138 |
| 3,820,908 | 6/1974 | Maxeiner | 403/133 |

FOREIGN PATENT DOCUMENTS

| 944,174 | 3/1974 | Canada | 403/135 |
| 960,053 | 12/1974 | Canada | 403/132 |
| 1,402,466 | 5/1965 | France | 403/133 |
| 1,248,148 | 9/1971 | United Kingdom | 403/122 |

*Primary Examiner*—Wayne L. Shedd
*Attorney, Agent, or Firm*—K. H. MacLean, Jr.

[57] ABSTRACT

A ball joint assembly with a preload feature derived from a dished washer type compression spring located between the semi-spherical head of the stud unit and the ball joint housing. The inner diameter edge of the dished washer spring engages the stud unit and has radially outward extending slotted portions therein which effectively shift the area of greatest flexure and stress outward from the inner edge on which the greatest wear occurs.

1 Claim, 5 Drawing Figures

BALL JOINT WITH SLOTTED SPRING BIASED STUD

The subject ball joint is an improvement over the ball joint shown in U.S. Pat. No. 3,969,030 issued July 13, 1976 and titled "Ball Joint with Composite Compression Spring." Both devices have the object of providing a preload on the ball joint and automatic wear takeup. The '030 disclosure utilizes a composite spring of elastomeric material to press a bearing member against the spherical head of the stud unit. The subject invention utilizes a particularly configured spring member in the form of a dished washer. This configuration is sometimes known as a Belleville spring. The inner diameter edge bears against the spherical head portion of the stud unit to bias the stud downward against bearing surfaces formed on the housing. A plurality of radially outwardly extending slotted portions from the inner diameter edge effectively shift the area of greatest flexure and stress radially outward from the inner edge. By moving the area of greatest flexure away from the inner edge, durability is greatly enhanced, since the inner edge portion is subject to the greatest wear.

The number and the exact configuration of the spring's slotted portions may be varied to change the force-deflection characteristics of the spring. Also, relatively thick steel stock may be utilized for the washer spring and still a desirable moderate spring force may be created by varying the number and configuration of the slots. In addition, the slotted portions permit a flow of grease from one end of the housing to the spherical head portion of the stud unit.

A feature then of the invention is the provision of a dished washer type spring in a ball joint with slots extending radially outward from the inner diameter edge to shift the area of greatest flexure and stress radially outward from the inner diameter edge which is the area of greatest wear.

Further advantages of the present invention will be more readily apparent after an examination of the following detailed description and with reference to the accompanying drawings in which a preferred embodiment of the invention is illustrated.

IN THE DRAWINGS

Figure 1:
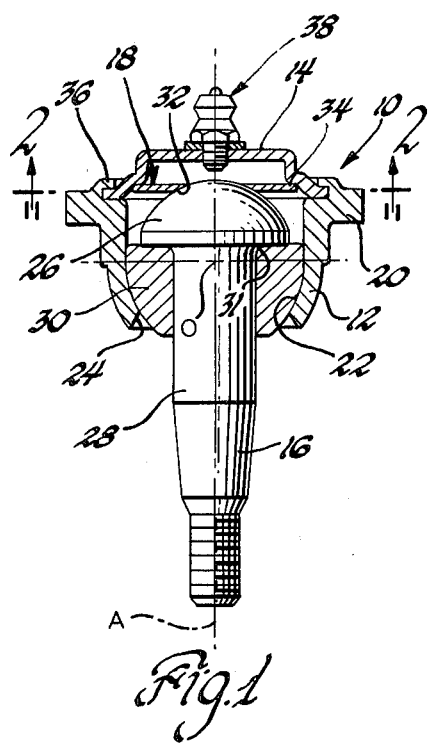
FIG. 1 is a sectional elevation of the subject ball joint having a dished washer type compression spring.

Referring now to the drawings, FIG. 1 illustrates a ball joint 10 comprising a housing 12, a cover 14, a ball stud unit 16 and a compression spring 18. The ball joint is commonly utilized in vehicle steering linkages. The housing 12 is a die-formed part having an outwardly directed peripheral flange 20 around an open end thereof. The opposite end portion of the housing is curved inward thus forming an internal and substantially semi-spherical bearing seat or surface 22. The center of the arcuate surface 22 is labeled 0. Surface 22 is formed about an opening 24.

The ball stud unit 16 has an integral head 26 and an elongated stud portion 28 of reduced diameter which is journaled through an annular complementary head portion 30. Portion 30 engages a shoulder at the junction 31 of the head 26 and stud 28. The heads 26 and 30 have substantially semi-spherical surfaces that form a ball portion of the stud unit 16 and permits the longitudinal axis A of stud unit 16 to rock about the center 0 of the housing 12 as the head portion 30 engages the fixed bearing surface 22 of the housing 12.

The head 26 of stud unit 16 is engaged by the inner edge 32 of the washer shaped compression spring 18. The outer edge 34 of spring 18 engages a portion of the cover 14 which is secured to housing by the spun-over or turned-over portion 36 on flange 20. A grease inlet fitting 38 of conventional design is threadably supported through the cover 14 for the introduction of grease into the housing interior.

Figure 2:
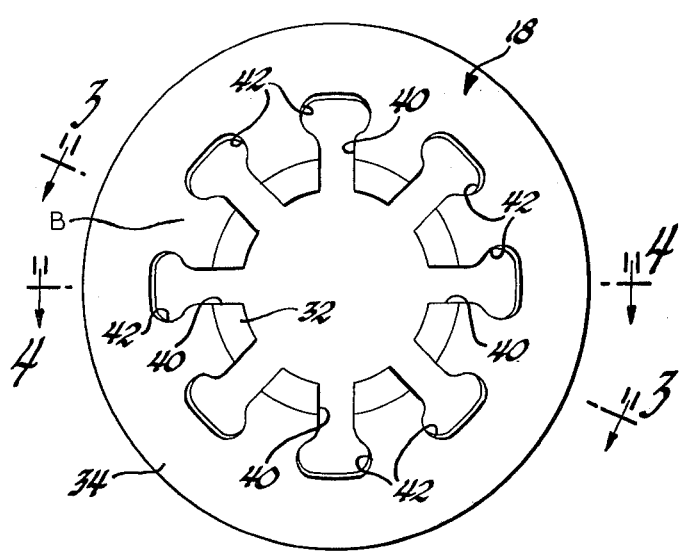
FIG. 2 is a view of the dished washer spring taken along view line 2—2 in FIG. 1.
Figure 3:
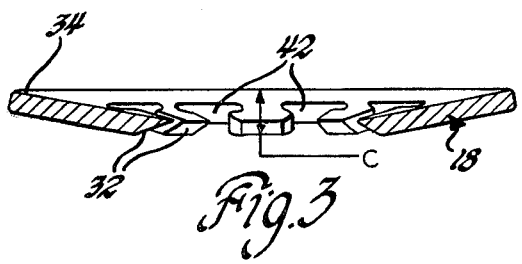
FIG. 3 is a sectional view of the spring taken along section line 3—3 in FIG. 2 and looking in the direction of the arrows.
Figure 4:
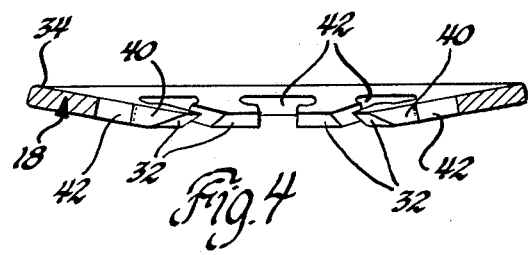
FIG. 4 is a sectioned view of the washer spring taken along section 4—4 in FIG. 2 and looking in the direction of the arrows.
Figure 5:
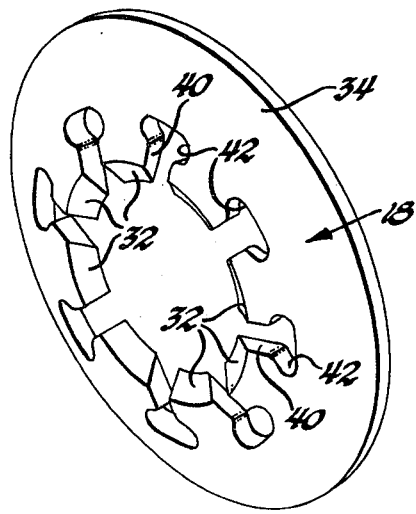
FIG. 5 is a perspective view of the washer spring.

In FIG. 2, a planar view of a preferred embodiment of the compression spring 18 illustrates the specific configuration of the inner diameter edge portion 32. The inner edge portion 32 is interrupted by outwardly directed slots 40 whose purpose and effect will be explained more fully hereinafter. The edge 32 itself is best shown in FIGS. 3 and 5 which illustrate the arcuate shape thereof to match the curve of the semi-spherical shape of the stud head 26. While the inner diameter edge 32 engages the head 26, the outer diameter edge 34 is pressured by the cover 14 which in an assembled position flexes the dished shape of the spring from the unstressed shape shown in FIGS. 3 and 5, to a more flattened condition as shown in FIG. 1. In some cases of extreme tolerance build-up, the spring may even pass through center. The axial movement of the inner edge 32 with respect to the outer edge 34 produces a downwardly directed load on the head 26 of the stud 16. This load presses head 30 against the bearing surface 22 to prevent damage by impact forces therebetween which could result by shock caused movement.

The radially outwardly extending slotted openings 40 in the spring 18 serve an important function in moving the area of greatest flexure and stress outward to area B between the roots of openings 40 and away from the inner diameter edge 32 (see FIG. 2). The inner diameter edge 32 bears against the head 26 and is subject to wear by movement therebetween. By shifting to area B the greatest flexure and stress the durability and usefulness of the subject ball joint is improved. In the particular embodiment shown in FIG. 2, the dished spring 18 has particularly configured openings 40 which include an enlarged root portion 42. This enlarged portion 42 may vary in dimension with different embodiments of the subject ball joint to provide varying preload forces on the head portion 26 of a stud unit. Obviously, by increasing the extent of the enlarged portion 42, the preload force is decreased and by decreasing the circumferential dimension of the portion 42, the preload is increased.

The spring 18 shown in the drawings has been successfully utilized in a ball joint for test. The use of the slotted openings 40 permits a relatively thick metal stock to be utilized, yet a desirably moderate preload force can be produced thereby. For the purpose of example only, a spring has been tested successfully which had an inner diameter of 0.5 inches and a washer thickness of 0.059 inches. The unstressed dimension labeled C in FIG. 3 was about 0.125 inches. A maximum preload force of approximately 400 lbs. was produced by stressing the spring during assembly to a nearly flattened condition. The dimension between the enlarged portions 42 (area B) was approximately 0.15 inches. The material of spring 18 is SAE 1075 spring steel.

Although only one embodiment of the subject invention has been described in detail and illustrated in the drawings, it should be understood that modifications to the invention are contemplated which still would fall under the scope of the following claim which solely defines the invention.

What is claimed is as follows:

1. An improved preloaded ball joint comprising: a housing having an outward peripheral flange formed about an open end thereof and a reduced opening formed at the opposite end; a ball stud unit consisting of a generally spherical bearing head portion adjacent said open end of said housing and a stud portion disposed outwardly of said reduced opening; a combination preload spring and bearing member having a generally annular form with inner and outer edges disposed in said housing, the inner diameter edge being formed to engage the bearing portion of said ball stud unit at a location opposite said stud portion, the resilient properties of said preload spring and bearing member biasing the bearing portion of the ball stud unit against said housing; a cover member having an outwardly directed peripheral flange engaged by the outward flange of said housing to close said open housing end, the outer diameter edge of said preload spring and bearing member when assembled in the ball joint directly engaging said cover member to cause the spring inner edge to press against said bearing portion of said ball stud unit; said spring and bearing member having an interrupted inner edge portion formed by radially outwardly extending slots spaced thereabout, thereby shifting the location of the spring's greatest flexure and stress radially outward from the inner diameter edge which sustains the greatest frictional wear by movements of the stud unit.

* * * * *